United States Patent
Tong

(10) Patent No.: US 6,431,550 B1
(45) Date of Patent: Aug. 13, 2002

(54) HYDROGEN SEAL RING HAVING SEAL AT RING INTERSEGMENT

(75) Inventor: Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 09/669,452

(22) Filed: Sep. 25, 2000

(51) Int. Cl.[7] .................................................. F16J 15/44

(52) U.S. Cl. .................... 277/346; 277/355; 277/500; 277/543; 277/546

(58) Field of Search .......................... 277/346, 347, 277/357, 355, 434, 459, 489, 493, 497, 500, 543, 546

(56) References Cited

U.S. PATENT DOCUMENTS

| | | | |
|---|---|---|---|
| 5,192,083 A | * | 3/1993 | Jones et al. ................. 277/411 |
| 6,082,740 A | | 7/2000 | Jones |
| 6,325,381 B1 | * | 12/2001 | von Engelbrechten ...... 277/361 |

\* cited by examiner

*Primary Examiner*—Anthony Knight
*Assistant Examiner*—E Peavey
(74) *Attorney, Agent, or Firm*—Nixon & Vanderhye PC

(57) ABSTRACT

A seal is provided at the intersegments of hydrogen seal rings for preventing oil leakage through this potential gap between the seal ring segments. By minimizing leakage through the gaps between the open rings, hydrogen consumption in hydrogen-cooled generators due to leakage oil is reduced. In a preferred embodiment, the seal is provided by a brush seal secured to one of the seal ring segments and received in a slot defined in the other of the seal ring segments.

24 Claims, 4 Drawing Sheets

HYDROGEN SEAL RING HAVING SEAL AT RING INTERSEGMENT

BACKGROUND OF THE INVENTION

The invention relates to hydrogen seal rings and, more specifically, to a seal structure for preventing oil leakage through a circumferential gap between the seal ring segments in rotary electric machines.

Hydrogen has been widely used as a coolant in a variety of rotary electric machines, due to its desirable thermophysical properties including low density and high specific heat. However, a primary disadvantage of using hydrogen is that the hydrogen purity must be maintained above its explosive limit (74% hydrogen in air). Therefore, a primary consideration for ensuring the safe operation of hydrogen-cooled rotary machines, such as turbogenerators, is designing highly reliable and efficient hydrogen seal systems therefor.

In a hydrogen-cooled turbogenerator, hydrogen seals are utilized both to seal high-pressure hydrogen at the interface of the rotating shaft, and to prevent air from entering the casing and developing an explosive mixture with the hydrogen.

Before the early 1980s, hydrogen seal systems consisted of a pair of four segmented bronze rings disposed in a seal casing. The newer babbitted steel seal rings 10 are each made in two 180° segments 12,14 as illustrated in FIG. 1. A typical hydrogen seal system is schematically shown in FIG. 2. In that illustration, an annular seal casing is partially shown which is adapted to be mounted to a generator end shield (not shown) in surrounding and sealing relationship with a rotor/shaft 16. The casing is formed in two main parts, referred to hereinbelow as casing halves, each extending 180° about the shaft. For ease of description, the upper casing half 18 and the seal ring segments 12 disposed therein are illustrated and will be described in detail. It is to be understood, however, in an exemplary embodiment, the lower casing half has a corresponding construction. The upper casing half 18 is of two-part construction, including a seal casing main body 20 and a seal casing cap segment 22. The seal casing cap segment has a generally h-shaped cross-section, forming a radially inwardly directed chamber or cell 24 opening in a radially inward direction towards the shaft 16 for housing radially inwardly projecting seal rings 12 which in turn engage the shaft.

Each seal casing cap segment 22 is formed with an axial portion 26 connecting an upper radial flange portion 28 and lower inner and outer radial portions 30,32. The axial portion 26 thus defines a base for the chamber 24 while radial portions 30 and 32 form two, axially spaced, parallel sides of the chamber 24. Axially opposed shoulders 34,36 define an opening facing the rotor shaft 16. The seal casing cap segment 22 is fastenable to the seal casing main body 20 by a semi-annular array of bolts 38 passing through holes in the radial portion 28 of the cap and threadably received in the main body 20.

Within the chamber or cell 24, there are seated a pair of side-by-side seal ring segments 12, each extending approximately 180° about the casing half 18. The rings 10 are held together radially and apart axially by two coil springs 40 (only one of which is shown in FIG. 2), each extending substantially 180° within the cell or chamber. The spring is seated within an area created by tapered surfaces 42 on the respective ring segments 12. Opposite ends of the spring are anchored to axially extending pins (not shown) via a hook or the like (not shown) formed at each end thereof. As is conventional, the pin is located within aligned bores in radial wall portions of the casing cap segment. The pin is also used to align and hold a labyrinth type oil seal 46. The spring biases the seal ring segments 12 radially inwardly and in axially opposite directions, against opposed faces of the inner and outer radial wall portions 30,32 of the chamber 24.

In use, seal oil is introduced into the cavity of chamber 24 behind or radially outside the seal rings 12, at a pressure higher than the hydrogen pressure inside the casing. Then, the high pressure seal oil flows radially between the seal rings toward the rotating shaft, where the sealing oil flow divides and runs with the clearance between the shaft and seal rings. At the hydrogen side 48 of the seal rings, the oil flows evenly between the shaft and the inner seal ring all the way around the seal ring at their interface and thus seals hydrogen from leaking and keeps the seal ring centered on the shaft. Similarly, the oil is uniformly distributed between the shaft 16 and the outer seal ring 10 at the air side 50 of the seal.

Hydrogen is absorbed by the oil that passes to the hydrogen side of the seals. The amount of hydrogen that is absorbed is proportional to the oil flow rate and the degree of solubility of hydrogen in oil. In general, a large oil flow rate yields high hydrogen consumption.

As illustrated in FIG. 1, hydrogen seal rings 10 are usually made into segments 12,14, split at horizontal joints. The two segments can either be bolted together at the horizontal joint or held by two coil springs suitably attached to the casing. As described hereinbelow, the invention is applicable to a non-bolted seal rings. As noted above, the purpose of the hydrogen seal springs 40 is to separate the two sealing rings and keep the sides of the rings against the casing. In normal operation, these rings maintain a uniform clearance and do not allow oil leakage at the ring segment joints. They are free to expand radially but prevented from rotating by either the pins to which the springs are attached or an anti-rotation device. In this way, the rings can float freely with respect to the seal casing cap. However, under certain circumstances, the seal rings may stick at certain positions and stop floating with respect to the casing cap. As a result, leakage could take place through the circumferential gaps formed between the open rings. This may lead to oil flooding inside the generator and high hydrogen consumption. The possible causes for the seal ring sticking or becoming skewed include a high vibrating shaft, rough sliding surfaces of the seal rings and/or the seal casing cap, and weak seal springs. Because the gap provides a short flow path for the sealing oil, it reduces the oil flowing through the annular clearances between the rings and the shaft. In severe cases, it may lead to the failure of the hydrogen seal system. In that case, the generator will be shut down automatically.

BRIEF SUMMARY OF THE INVENTION

The present invention was developed to address the potential problem of oil leakage through the circumferential gaps between the seal ring segments, in a case where a seal ring part stops floating with respect to the casing cap, resulting in flow through the gaps formed between the opened rings.

The invention more specifically proposes to provide a seal at the intersegments of the hydrogen seal rings for preventing oil leakage through this potential gap between the seal ring segments. The invention was further developed to minimize leakage through the gaps between the open rings so as to reduce hydrogen consumption in hydrogen-cooled generators due to leakage oil. The invention also has the advantageous result of increasing generator reliability and life cycle time by minimizing the risk of oil flooding and related inefficiencies or downtime.

Thus, the invention is embodied in the use of a seal at the hydrogen seal ring intersegment to minimize oil leakage through the intersegment gaps. In a presently preferred embodiment of the invention, the seal provided at the hydrogen seal ring intersegments is a short brush seal.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
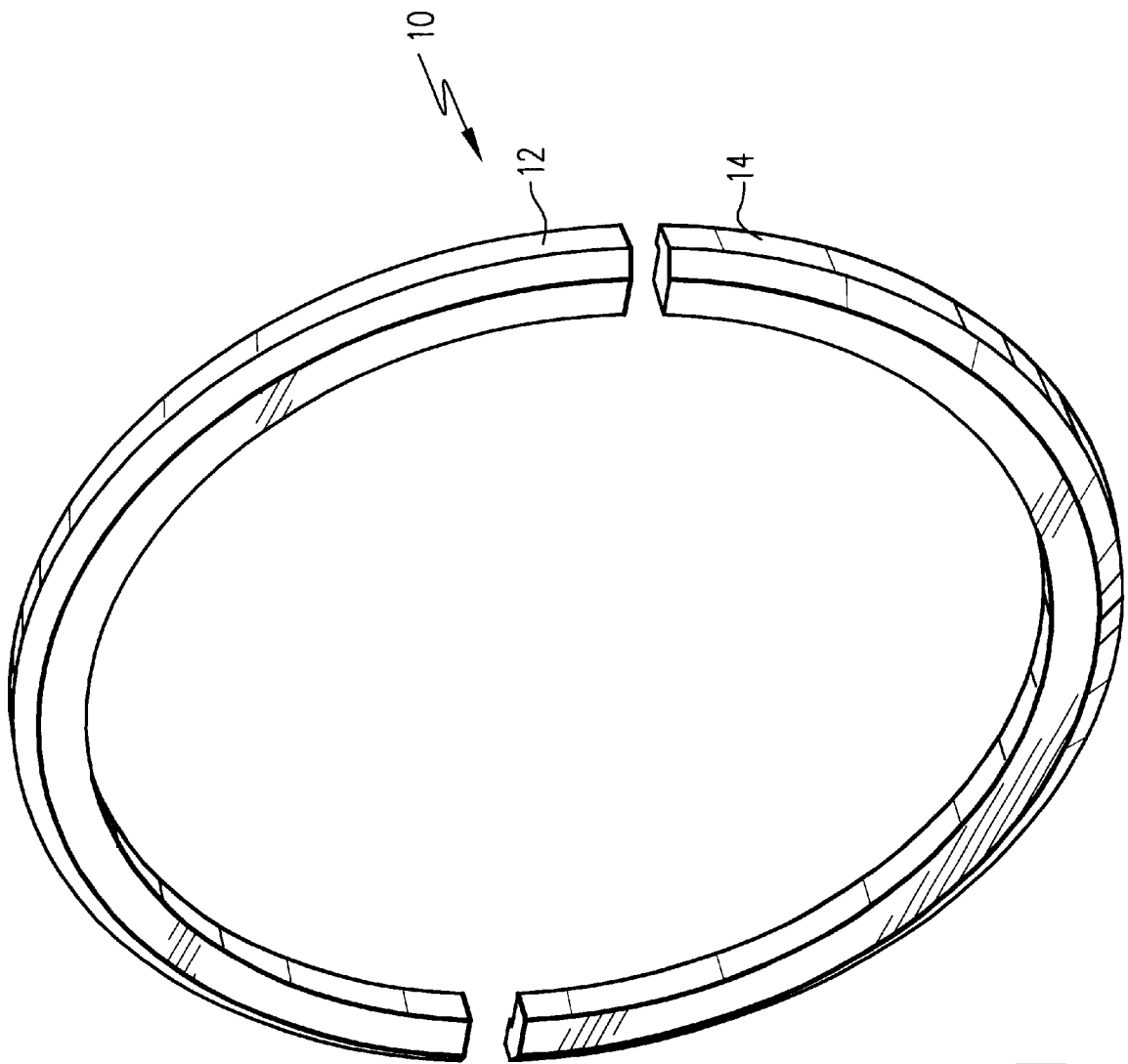
FIG. 1 is a perspective view showing upper and lower hydrogen seal rings.
Figure 2:
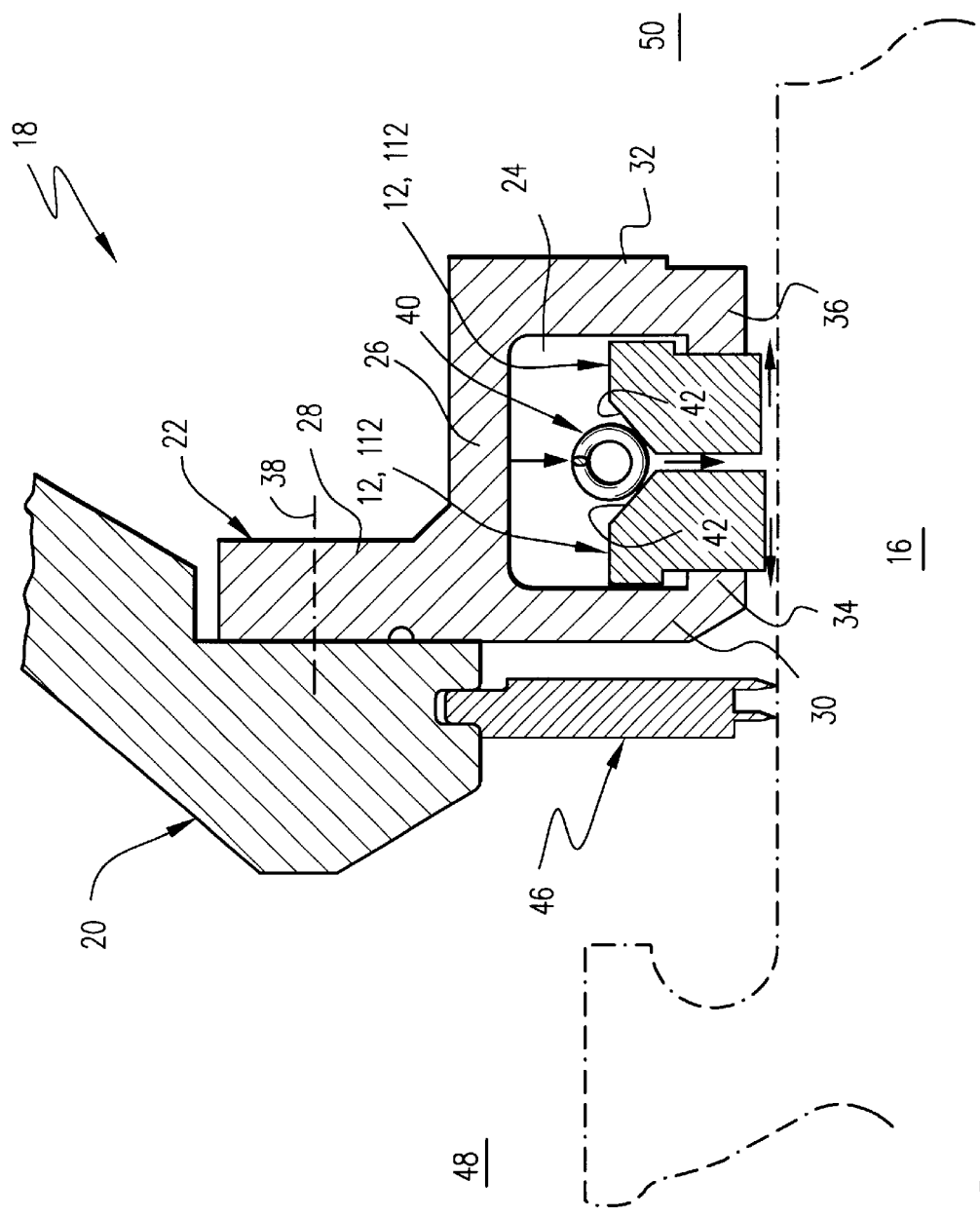
FIG. 2 is a schematic cross-sectional view of a hydrogen seal system.

As summarized above, the invention provides a seal at the intersegments of the hydrogen seal rings for preventing oil leakage through this potential gap between the seal ring segments. The improved seal rings 112 of the invention are adapted to be disposed in a seal casing as described above with reference to FIG. 2. Accordingly, that figure has been annotated to include reference number 112 to illustrate the disposition of the improved seal rings 112 and to the extent that it corresponds to the conventional assembly, a description of the seal assembly incorporating the improved seal rings 112, will not be provided here.

Figure 3:
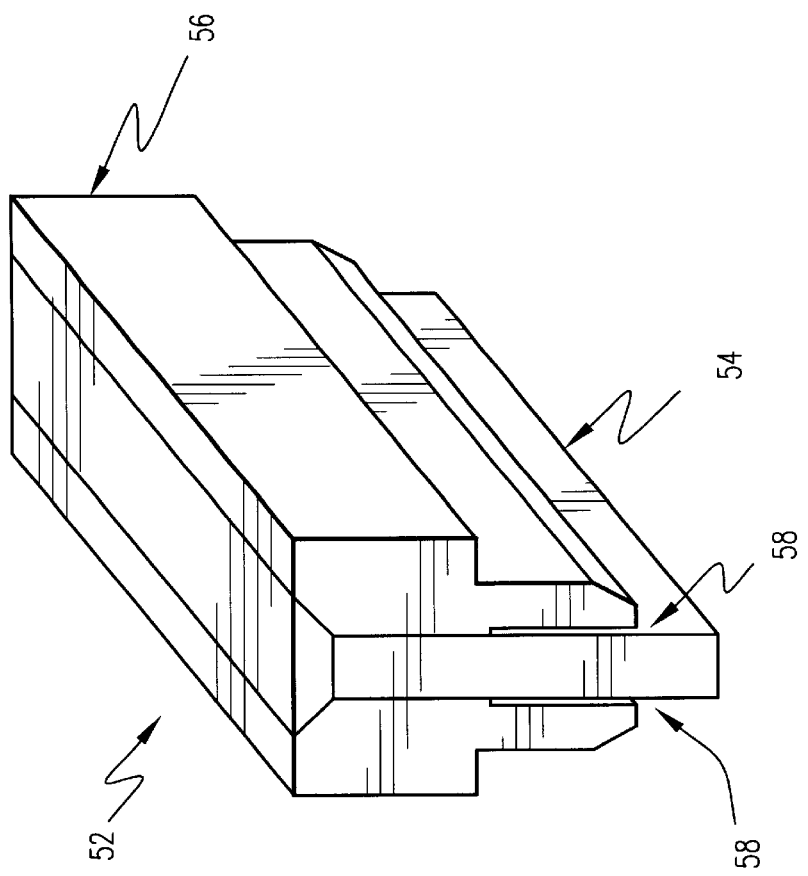
FIG. 3 is a schematic isometric view of a brush seal structure.

As shown in FIG. 3, a brush seal 52 is made by sandwiching bristles 54 between two metal plates 56 and orienting the sandwiched bristles at an angle of about 90° to the surface with which it forms a seal. Typically, the bristle diameter ranges from about 0.002 to about 0.01 inch, depending on the bristle material (metal or non-metal), temperature, pressure and operating condition (static or dynamic). The bristles are fabricated either by brazing/welding for metal bristles or gluing for nonmetal bristles. From FIG. 3 it can be observed that at the lower part of the brush, a space 58 is left at each side of the bristles 54. This allows the bristles to flex and recover during operation. Since this type of brush is capable of sealing positive or negative pressure changes with respect to the axial direction, it is a bi-directional brush. The use of such bi-directional brushes is preferred because it can simplify the manufacturing process and avoid a possible installation error.

Figure 4:
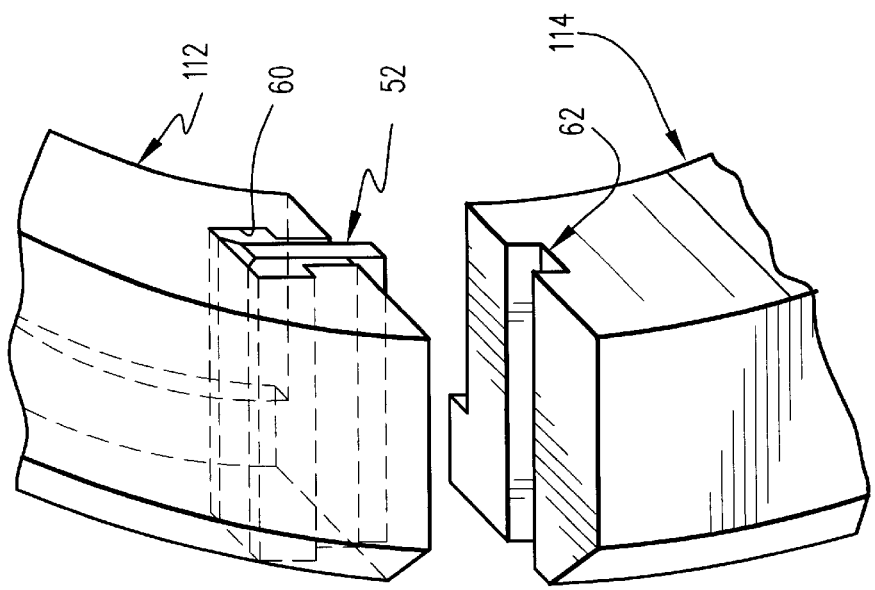
FIG. 4 is a schematic perspective view, partly in phantom, showing a brush seal assembled to an upper seal ring segment and in opposed facing relation to a seal slot machined in a lower ring segment.

In the embodiment illustrated in FIG. 4, a brush seal 52 is mounted in a T-shaped slot 60 defined in at least one and preferably each circumferential end of one of the seal ring segments 112. As illustrated, the slot extends in a direction that is generally radially with respect to a center of the shaft (not shown in FIG. 4) disposed through the seal ring.

In the illustrated embodiment, a seal slot 62 is machined in the circumferential end of the seal ring segment facing the brush to receive the same to provide an additional guarantee of oil sealing. Under normal operating conditions, the two seal ring segments 112,114 contact each other so that no oil flows between them. However, in the event of sealing malfunction, the brush seal is brought into play to seal oil that would otherwise seep between the open seal ring segments. As illustrated, the brush seal 52 is preferably but is not necessarily mounted to each circumferential end of the upper seal ring segment 112.

The brush seals may be installed to the seal ring segment in any one of a number of ways. For example, with reference to FIG. 5, a gap 64 can be reserved between the metal plate(s) 56 to which the brush 54 is mounted and the opposing wall(s) of the T-shaped slot or cut out in which the brush seal is disposed. A spring mechanism such as a leaf spring 66 can then be disposed between the brush seal and the wall of the slot of the seal ring to urge the brush seal toward the other seal ring segment. Although in this embodiment one leaf spring is preferably disposed at the top of the brush seal, a leaf spring or other spring structure may be disposed in addition or in the alternative between opposed side wall(s) of the brush and groove.

Another alternate spring structure for mounting the brush seal is to provide a rubber strip 68 fit into a space at the side (FIG. 6) or top of the brush seal. More specifically, a rubber strip may be disposed in the T-shaped slot or against a surface of the brush seal in a stretched disposition to reduce its thickness. Once the parts are assembled, the strip is released. When the strip is released, it will tend to recover its original thickness and will tighten or wedge the brush seal within the slot or groove of the seal ring.

Figures 5, 6, 7, 8:
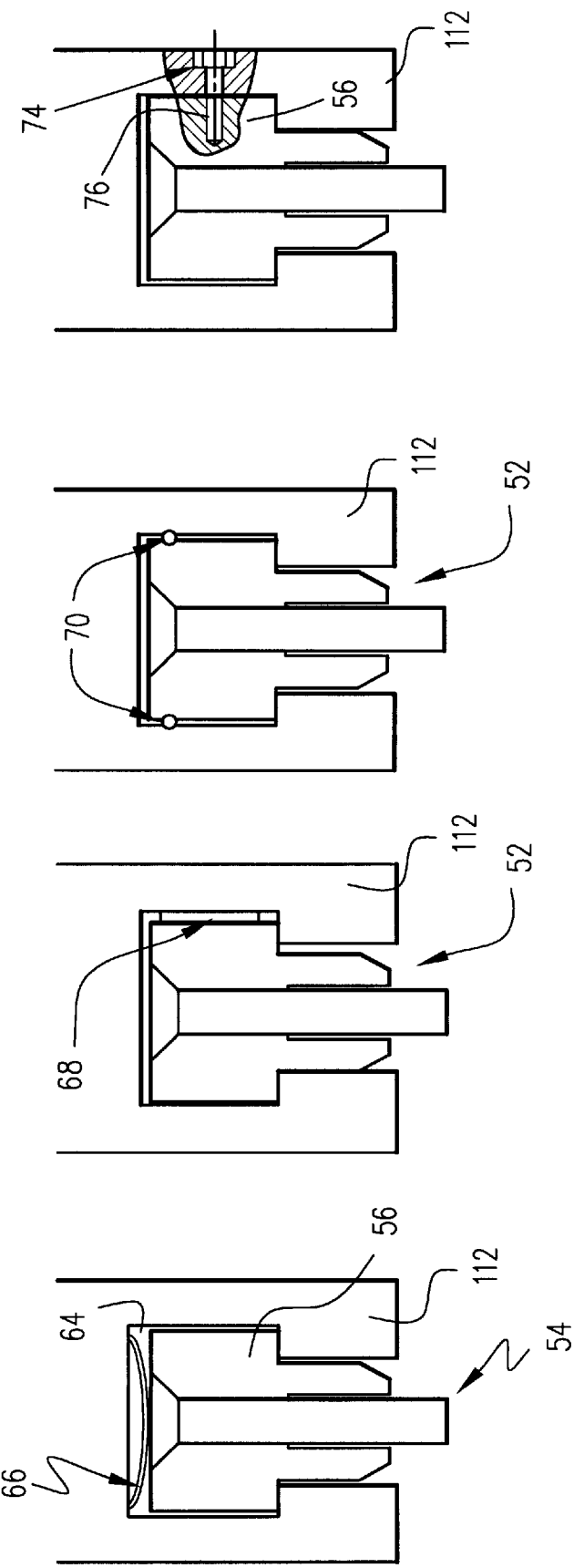
FIG. 5 schematically illustrates the assembly of a brush seal to a seal ring using a leaf spring as an embodiment of the invention.
FIG. 6 is a schematic illustration showing a brush seal mounted to a seal ring using a rubber strip as a further alternate embodiment of the invention
FIG. 7 is a schematic illustration of a brush seal welded to a seal ring as an alternate embodiment of the invention.
FIG. 8 is a schematic view, partly in cross-section, of a brush seal mounted to a seal ring using a screw or bolt as yet a further alternate embodiment of the invention.

Another alternative is shown in FIG. 7. In this embodiment, the ends of each brush seal may be spot welded as at 70 to reliably secure the brush seal 52 with respect to the seal ring 112. It is apparent that spot welding would be the most reliable attachment of the brush seal to the spring ring segment.

Yet another mounting alternative, shown in FIG. 8, is to fix the brush seal 52 to the seal ring segment 112 at the side of the seal brush with one or more screws or bolts 74 (only one of which is shown in FIG. 8). In this case, to avoid damaging the bristles, the screw or bolt hole(s) 76 in the metal plate(s) 56 should not go through the bristles.

Other known mechanical attachments, components and methods could be used to secure the brush seals with respect to seal rings, as will be appreciated by the skilled artisan. While in the illustrated embodiment, the brush seal is illustrated as mounted to each circumferential end of the upper seal ring, since it is desirable for the seal brush to depend downwardly, it is to be understood that the gap seal, such as a brush seal, could in the alternative be mounted to the lower seal ring for extending to and sealingly contacting a seal slot therefor. As a further alternative, each seal ring segment could be provided with a gap seal structure, such as a brush seal, at one circumferential end and a complementary structure, such as a groove, at the other circumferential end.

In most brush seal applications, bristle wear is a problem that will affect the sealing operation. In the embodiments of the invention, since the brush does not contact any rotating surfaces, no such wear problem would be expected.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A seal ring assembly for a rotor shaft comprising:
   an upper seal casing defining a first radially inwardly directed channel;
   a lower seal casing defining a second radially inwardly directed channel, said upper and lower seal casings being joined about a shaft to form a substantially 360° seal casing;
   first and second seal rings, each composed of upper and lower seal ring segments respectively disposed in said first and second radially inwardly directed channels of said upper and lower seal casings, said upper and lower seal ring segments being resiliently joined about the shaft to form a substantially 360° seal with said upper and lower ring seal segments of each said seal ring resiliently secured together at circumferential interfaces therebetween; and
   a flexible seal structure defined at each said circumferential interface to substantially seal a circumferential gap between said upper and lower seal ring segments.

2. The seal assembly of claim 1, wherein said upper seal ring segments disposed in said first channel are biased radially inwardly and in opposite axial directions by a spring.

3. The seal assembly of claim 2, wherein said upper seal ring segments have adjacent tapered surfaces against which said spring is seated.

4. The seal assembly of claim 1, wherein said lower seal ring segments disposed in said second channel are biased radially inwardly and in opposite axial directions by a spring.

5. The seal assembly of claim 4, wherein said lower seal ring segments have adjacent tapered surfaces against which said spring is seated.

6. A seal ring assembly for a rotor shaft comprising:
   an upper seal casing defining a first radially inwardly directed channel;
   a lower seal casing defining a second radially inwardly directed channel, said upper and lower seal casings being joined about a shaft to form a substantially 360° seal casing;
   first and second seal rings, each composed of upper and lower seal ring segments respectively disposed in said first and second radially inwardly directed channels of said upper and lower seal casings, said upper and lower seal ring segments being resiliently joined about the shaft to form a substantially 360° seal with said upper and lower ring seal segments of each said seal ring resiliently secured together at circumferential interfaces therebetween; and
   a seal structure defined at each said circumferential interface to substantially seal a circumferential gap between said upper and lower seal ring segments, wherein said seal structure comprises a brush seal mounted to one of said upper and lower ring seal segments, at a circumferential end thereof.

7. The seal assembly of claim 6, further comprising a sealing groove defined in a circumferential end face of the other of said upper and lower ring seal segments for receiving said brush seal to seal the circumferential gap therebetween.

8. The seal assembly of claim 6, wherein said brush seal is mounted to said upper ring seal segment.

9. The seal assembly of claim 6, wherein a said brush seal is mounted to each circumferential end of said upper ring seal segment.

10. The seal assembly of claim 9, further comprising a seal slot defined in each circumferential end face of said lower ring seal segment for receiving a respective brush seal, to seal the circumferential gaps therebetween.

11. The seal assembly of claim 6, wherein said brush seal is disposed in a T-shaped slot defined at said circumferential end of said one of said upper and lower ring seal segments.

12. The seal assembly of claim 11, wherein said brush seal is substantially fixed in said T-shaped slot with a spring structure disposed between said brush seal and a wall of said T-shaped slot.

13. The seal assembly of claim 12, wherein said spring structure comprises a leaf spring.

14. The seal assembly of claim 12, wherein said spring structure comprises a rubber strip.

15. The seal assembly of claim 6, wherein said brush seal is welded to said one of said upper and lower ring seal segments.

16. The seal assembly of claim 15, wherein said brush seal is disposed in and welded to a T-shaped slot defined at said circumferential end of said one of said upper and lower ring seal segments.

17. The seal assembly of claim 11, wherein said brush seal is substantially fixed in said T-shaped slot with a screw or bolt threaded through a wall of said T-shaped slot to engage said brush seal.

18. A seal ring assembly for a hydrogen cooled turbogenerator, comprising:
   an upper seal casing defining a first radially inwardly directed channel;
   first and second, side-by-side upper seal ring segments disposed in said first radially inwardly directed channel;
   a lower seal casing defining a second radially inwardly directed channel;
   first and second, side-by-side lower seal ring segments disposed in said second radially inwardly directed channel;
   said upper and lower seal casings and said upper and lower seal ring segments being respectively joined about a shaft of said turbogenerator to form a substantially 360° seal, said upper and lower ring seal segments being respectively resiliently secured together at first and second interfaces therebetween; and
   a brush seal secured to a each circumferential end of each said upper seal ring segment to substantially seal a circumferential gap between said upper and lower ring seal segments at said interfaces therebetween.

19. The seal assembly of claim 18, further comprising a seal slot defined in each circumferential end face of each said lower seal ring segment for receiving a respective brush seal, to seal said circumferential gaps therebetween.

20. The seal assembly of claim 18, wherein said brush seal is substantially fixed in a T-shaped slot with a spring structure disposed between said brush seal and a wall of said T-shaped slot.

21. A seal ring assembly for a rotor shaft comprising:

an upper seal casing defining a first radially inwardly directed channel;

a lower seal casing defining a second radially inwardly directed channel, said upper and lower seal casings being joined about a shaft to form a substantially 360° seal casing;

first and second seal rings, each composed of upper and lower seal ring segments respectively disposed in said first and second radially inwardly directed channels of said upper and lower seal casings, said upper and lower seal ring segments being resiliently joined about the shaft to form a substantially 3600 seal with said upper and lower ring seal segments of each said seal ring resiliently secured together at circumferential interfaces therebetween; and a flexible seal structure defined at each said circumferential interface to substantially seal a circumferential gap between said upper and lower seal ring segments, each said seal structure extending radially so as to substantially reduce leakage flow in an axial direction through said circumferential gap.

22. The seal assembly of claim 21, wherein said upper seal ring segments disposed in said first channel are biased radially inwardly and in opposite axial directions by a first spring, and wherein said lower seal ring segments disposed in said second channel are biased radially inwardly and in opposite axial directions by a second spring.

23. The seal assembly of claim 22, wherein said upper seal ring segments have adjacent tapered surfaces against which said first spring is seated, and wherein said lower seal ring segments have adjacent tapered surfaces against which said second spring is seated.

24. The seal assembly of claim 21, wherein said seal structure comprises a flexible seal component mounted to one of said upper and lower ring seal segments, at a circumferential end thereof, and further comprising a sealing groove defined in a circumferential end face of the other of said upper and lower ring seal segments for receiving said flexible seal component to seal the circumferential gap therebetween.

\* \* \* \* \*